(12) United States Patent
Fujiwara et al.

(10) Patent No.: US 6,315,932 B1
(45) Date of Patent: Nov. 13, 2001

(54) PROCESSES FOR THE PRODUCTION OF EXTRUDED FOAMS OF STYRENE RESINS

(75) Inventors: Hiroshi Fujiwara; Hiroshi Kobayashi; Fuminobu Hirose, all of Settsu (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/367,810

(22) PCT Filed: Dec. 24, 1998

(86) PCT No.: PCT/JP98/05936

§ 371 Date: Aug. 23, 1999

§ 102(e) Date: Aug. 23, 1999

(87) PCT Pub. No.: WO99/33625

PCT Pub. Date: Jul. 8, 1999

(30) Foreign Application Priority Data

Dec. 24, 1997 (JP) ................................................. 9-355618
Dec. 24, 1997 (JP) ................................................. 9-355619
Jan. 9, 1998 (JP) ................................................. 10-3305

(51) Int. Cl.⁷ ............................. B29C 44/20; C08J 9/14
(52) U.S. Cl. ......................... 264/53; 264/51; 264/288.8; 521/79; 521/88
(58) Field of Search .............................. 264/53, DIG. 5, 264/51, 288.8; 521/79, 88

(56) References Cited

U.S. PATENT DOCUMENTS

| 3,327,031 | * | 6/1967 | Boyer et al. | 264/53 |
| 4,435,345 | * | 3/1984 | Colombo | 264/53 |
| 5,286,757 | * | 2/1994 | Smith et al. | 521/79 |
| 5,453,454 | * | 9/1995 | Alicke et al. | 264/DIG. 5 |
| 5,576,094 | * | 11/1996 | Callens et al. | 521/79 |
| 5,601,753 | * | 2/1997 | Omure et al. | 521/98 |

FOREIGN PATENT DOCUMENTS

| 5-222234 | | 8/1993 | (JP) . | |
| 7-507087 | | 8/1995 | (JP) . | |
| 10-265605 | | 10/1998 | (JP) . | |
| 10-273548 | | 10/1998 | (JP) . | |
| 51-91969 | * | 8/1976 | (JP) | 264/DIG. 5 |

* cited by examiner

*Primary Examiner*—Allan R. Kuhns
(74) *Attorney, Agent, or Firm*—Armstrong, Westerman, Hattori, McLeland & Naughton, LLP

(57) ABSTRACT

An extrusion foaming method for obtaining a styrene resin foam by introducing a blowing agent into the resin under pressure by which a foam having excellent heat insulating property and compressive strength can be produced with excellent stability using a blowing agent which is as environmentally safe as possible, characterized in that a foam is obtained by using a blowing agent comprising mainly less than 40% by weight and 5% by weight or more of an ether, and more than 60% by weight and not more than 95% by weight of a saturated hydrocarbon having 3 to 5 carbon atoms, based on the entire amount of the blowing agent, or as required, by using a blowing agent wherein a part of the saturated hydrocarbon in the foregoing blowing agent is replaced by a fluorinated hydrocarbon with concern for the environment, and preferably in that the ratio Z/X of cells constituting the foam wherein X is the average cell size in the direction of extrusion and Z is the average cell size in the direction of thickness is adjusted to 1 or less, preferably 0.8 or less by stretching the foam with heating after the extrusion.

16 Claims, No Drawings

PROCESSES FOR THE PRODUCTION OF EXTRUDED FOAMS OF STYRENE RESINS

TECHNICAL FIELD

The present invention relates to a styrene resin extruded foam which is employed in building materials and the like. More particularly, the invention relates to a method for producing a styrene resin extruded foam which is excellent in environmental compatibility, excellent in heat insulating ability and compressive strength, and also excellent in terms of the stability during manufacturing, as well as a foam produced thereby.

BACKGROUND ART

As a method for producing a styrene resin foam, a method for producing such foam continuously by plasticizing a styrene resin in an extruder or the like, introducing a volatile organic blowing agent such as methyl chloride into the resin to form a mixture, cooling the resultant mixture to a temperature suitable for obtaining a satisfactory foam, and then extruding the mixture into a lower pressure zone is proposed in JP, A, 47-9593, 52-17574 and 52-94366.

Such known methods propose methyl chloride as a volatile blowing agent suitable in producing satisfactory foams. Methyl chloride has been considered to be an extremely suitable blowing agent for the following reasons: Methyl chloride has a high ability of plasticizing a styrene resin and allows the production of a foam to be performed under a reduced extrusion pressure whereby contributing greatly to an industrially advantageous method for producing a styrene resin foam. Further, methyl chloride has extremely high permeability through a styrene resin foam so that it hardly remains in the foam whereby achieving a dimensional stability of the foam. Accordingly it has been employed for a long period.

Recently, a desire for paying much attention and taking measures in handling methyl chloride is increasing, and from the viewpoint of environmental compatibility, a substitute for methyl chloride is desirable if the performance of the foam industrially required can be maintained.

On the other hand, the so-called hydrocarbons and the so called flons are also proposed as examples of other volatile blowing agents (or blowing agents, when referred simply), and some are used industrially.

For example, a combination of isobutane (i-butane) and normal butane (n-butane) which are less permeable through styrene resin is employed as a blowing agent to obtain a foam having an excellent heat insulating property, as disclosed in JP, A, 1-174540. Alternatively, since an agent such as butane serves to provide a heat insulating property when allowed to remain in a certain amount in a foam, it may be employed in combination with methyl chloride to obtain a satisfactory foam, as disclosed in JP, A, 51-92871.

Among flons, a chlorine atom-containing halogenated carbon (hereinafter referred to as CFC) which is less toxic, nonflammable and chemically stable is proposed to be employed, as disclosed in JP, B, 41-672. Generally, flons have a tendency of remaining in a foam and a low thermal conductivity, which may contribute to the heat insulating property of a foam besides the ability of producing a satisfactory foam. Accordingly, flons tend to be considered to be essential for achieving a high heat insulating property.

However, it is recently pointed out that CFCs have some adverse effects on the ozone layer, and are desired to be replaced if possible with any substitute.

Under such circumstances, a variety of attempts have been made to achieve a satisfactory environmental compatibility.

First, as a substitute of alkyl chlorides represented by methyl chloride, ethers or inorganic gasses such as carbon dioxide are proposed or investigated.

For example, JP, A, 7-507087 discloses to obtain a styrene resin extruded foam body having a thickness of 20 mm or more and a cross-sectional area of 50 cm$^2$ or more by using a mixture of dimethyl ether and carbon dioxide in a specific mixing range. In addition to dimethyl ether and carbon dioxide, various substances such as saturated hydrocarbons, chlorinated fluorinated hydrocarbons obtained by replacing a part of the chlorine atoms of CFC with hydrogen atoms (hereinafter abbreviated as HCFC), fluorinated hydrocarbons, i.e., flons containing no chlorine atom (hereinafter abbreviated as HFC), alcohols and ketones, were listed in Detailed Description of this prior art to be combined unlimitedly with each other over very wide mixing range, and those exemplified are hydrocarbons such as propane and butane, HCFCs and HFCs such as 1,1-difluoro-1-chloroethane (hereinafter abbreviated as HCFC142b), 1,1-difluoroethane (hereinafter abbreviated as HFC152a) and 1,1,1,2-tetrafluoroethane (hereinafter abbreviated as HFC134a).

However, these substances differ from each other in the important factors determining the condition of a foam, such as specific parameters on styrene resin including permeability, saturated impregnation level and plasticizing effect, as well as, physical characteristics including critical temperature, critical pressure, vapor pressure and boiling point, the difference being prominent among alcohols, flons and hydrocarbons. Accordingly, when using dimethyl ether with these substances, a good foam which satisfies at the same time the performance and characteristics industrially required, such as compressive strength, heat insulating property, appearance, expansion ratio, closed cell ratio, manufacturing stability and the like in addition to the thickness and the sectional area, is not always obtained with mixing them just simply, but it is essential to select the kind of a substance to be mixed and to modify the manufacturing process appropriately in view of the use or purpose of foams to be obtained. With such a simple technical idea as just mixing them simply, it is obvious that the range of the mixing ratio over which industrially useful foams can be obtained is limited.

For example, 1,1-difluoroethane and ethanol are different from each other in various physical characteristics as shown below, and thus should be handled differently in view of the internal pressure and the cell forming ability.

|  | 1,1-Difluoroethane | Ethanol |
|---|---|---|
| Boiling point | −24.1° C. | 78.32° C. |
| Critical temperature | 113.3° C. | 243.1° C. |
| Critical pressure | 46.1 Kgf/cm$^2$ | 65.2 Kgf/cm$^2$ |
| Evaporation latent heat | 79.4 Kcal/Kg | 204 Kcal/Kg |

However, the working examples in the prior art described above are limited to only use of dimethyl ether alone, the combinations of dimethyl ether with carbon dioxide, dimethyl ether with ethanol and dimethyl ether with ethanol plus carbon dioxide, and with respect to the suggested saturated hydrocarbons, HCFCs, HFCs and ketones, the using manner, the suitable range of mixing ratio and the characteristic properties or uses exhibited by using them were not disclosed specifically.

Furthermore, this prior art does not investigate sufficiently whether the foams disclosed actually satisfy other industrial requirements such as heat insulating property. That is, this prior art focuses only on getting a thick foam body with using, as a blowing agent, dimethyl ether which is expected to have cell-forming ability that means an ability of diffusing through cell membranes and forming cells (but the industrial requirement is, as a matter of course, not only to obtain thick foams but also to achieve physical characteristics such as heat insulating property and strength at the same time), and so the problems discussed above still remain unsettled.

On the other hand, as a substitute of CFCs, the use of HCFCs is proposed because of their lower adverse effect on the ozone layer and somewhat more preferable environmental compatibility. For example, JP, B, 57-7175 discloses use of HCFC142b as a blowing agent. Use of HFCs is also proposed. Since HFCs are believed generally to have no adverse effect on the ozone layer, they are considered to be more preferred than HCFCs in view of the environmental compatibility. For example, HFC134a was attempted to be used to form a foam as disclosed in JP, A, 1-98683, and a foam wherein 70% by weight or more of the amount of HFC134a used is allowed to remain in the cells thereof is disclosed in JP, A, 3-188137.

Nevertheless, alkyl chlorides represented by methyl chloride and ethyl chloride are the only kind of substances which are employed frequently in combination in the prior arts in spite of a large number of substances proposed as blowing agents, and the present situation where a substitute for alkyl chlorides is desired as described above still remains unchanged. In addition, the prior arts do not disclose any industrially useful information as to whether the substances can really provide, when used without being combined with an alkyl chloride, such industrially required physical characteristics as described in the prior arts, stability during manufacturing, production cost and the like.

Flons such as HCFCs and HFCs are considered to be useful in increasing the heat insulating ability of foams, but HCFCs pose a controversy on the effects on the ozone layer as described above, and HFCs intended to be used as a substitute of HCFCs are also desired to be reduced if possible in view of a recent trend of an environmental consciousness against the global warming although they are less affecting the ozone layer as compared with HCFCs or CFCs.

As discussed above, in spite of various technical attempts which have been made so far, there are no foams having an environmental compatibility together with industrial advantages such as high heat insulating property.

An object of the present invention is to provide a styrene resin extruded foam which is applicable to building materials, interior materials such as tatami floor sheet core, constructing materials and heat insulating materials, and in which an alkyl chloride, the use of which is desired to be reduced in view of an environmental compatibility, can be substituted, and which is excellent in terms of heat insulating property, compressive strength and extrusion stability during manufacturing.

DETAILED DESCRIPTION OF THE INVENTION

The inventors have made an intensive investigation to solve the problems described above, and finally discovered that, in a method for producing a styrene resin extruded foam by melting a styrene resin, introducing a blowing agent into the styrene resin, forming a fluid gel and then extruding the gel through a die to thereby cause foaming, it is possible to obtain a styrene resin extruded foam body having excellent environmental compatibility and foam physical characteristics by employing, as a blowing agent, a mixed blowing agent mainly comprising less than 40% by weight and 5% by weight or more of an ether, and a saturated hydrocarbon, and optionally HCFC142b or HFCs. Thus, the present invention has been completed.

The present invention relates to 1) a method for producing a styrene resin extruded foam by melting a styrene resin, introducing a blowing agent into the styrene resin, forming a fluid gel and then extruding the gel through a die into a lower pressure zone to thereby cause foaming, wherein a blowing agent comprises mainly less than 40% by weight, preferably less than 30% by weight and 5% by weight or more, based on the entire amount of the blowing agent, of one or more ethers selected from the group consisting of dimethyl ether, diethyl ether and methyl ethyl ether, preferably an ether consisting of dimethyl ether alone, and more than 60% by weight, preferably more than 70% by weight and not more than 95% by weight, based on the entire amount of the blowing agent, of one or more saturated hydrocarbons selected from the group consisting of saturated hydrocarbons having 3 to 5 carbon atoms.

Furthermore, the invention relates to 2) a method for producing a styrene resin extruded foam by melting a styrene resin, introducing a blowing agent into the styrene resin, forming a fluid gel and then extruding the gel through a die into a lower pressure zone to thereby cause foaming, wherein a blowing agent comprises mainly less than 40% by weight, preferably less than 30% by weight and 5% by weight or more, based on the entire amount of the blowing agent, of one or more ethers selected from the group consisting of dimethyl ether, diethyl ether and methyl ethyl ether, preferably an ether consisting of dimethyl ether alone, and more than 60% by weight, preferably more than 70% by weight and not more than 95% by weight, based on the entire amount of the blowing agent, of 1,1-difluoro-1-chloroethane.

Furthermore, the invention relates to 3) a method for producing a styrene resin extruded foam by melting a styrene resin, introducing a blowing agent into the styrene resin, forming a fluid gel and then extruding the gel through a die into a lower pressure zone to thereby cause foaming, wherein a blowing agent comprises mainly less than 40% by weight, preferably less than 30% by weight and 5% by weight or more, based on the entire amount of the blowing agent, of one or more ethers selected from the group consisting of dimethyl ether, diethyl ether and methyl ethyl ether, preferably an ether consisting of dimethyl ether alone, and more than 60% by weight, preferably more than 70% by weight and not more than 95% by weight, based on the entire amount of the blowing agent, of 1,1,1,2-tetrafluoroethane.

Furthermore, the invention relates to 4) a method for producing a styrene resin extruded foam by melting a styrene resin, introducing a blowing agent into the styrene resin, forming a fluid gel and then extruding the gel through a die into a lower pressure zone to thereby cause foaming, wherein a blowing agent comprises mainly less than 40% by weight, preferably less than 30% by weight and 5% by weight or more, based on the entire amount of the blowing agent, of one or more ethers selected from the group consisting of dimethyl ether, diethyl ether and methyl ethyl ether, preferably an ether consisting of dimethyl ether alone, and more than 60% by weight, preferably more than 70% by weight and not more than 95% by weight, based on the entire amount of the blowing agent, of one or more substances selected from the group consisting of difluoromethane, 1,1,1,2,3,3-hexafluoropropane, 1,1,1,3,3-pentafluoropropane and 1,1-difluoroethane.

Furthermore, the invention relates to 5) a method for producing a styrene resin extruded foam by melting a styrene resin, introducing a blowing agent into the styrene resin, forming a fluid gel and then extruding the gel through a die into a lower pressure zone to thereby cause foaming, wherein a blowing agent comprises mainly less than 40% by weight, preferably less than 30% by weight and 5% by weight or more, based on the entire amount of the blowing agent, of one or more ethers selected from the group consisting of dimethyl ether, diethyl ether and methyl ethyl ether, preferably an ether consisting of dimethyl ether alone, and 50% by weight or more, based on the amount after subtracting the ether from the entire amount of the blowing agent, of one or more saturated hydrocarbons selected from the group consisting of saturated hydrocarbons having 3 to 5 carbon atoms and 50% by weight or less, based on the amount after subtracting the ether from the entire amount of the blowing agent, of one or more blowing agents selected from the group consisting of 1,1-difluoro-1-chloroethane, 1,1,1,2-tetrafluoroethane, difluoromethane, 1,1,1,2,3,3-hexafluoropropane, 1,1,1,3,3-pentafluoropropane and 1,1-difluoroethane, preferably one or two blowing agents selected from the group consisting of 1,1-difluoro-1-chloroethane and 1,1,1,2-tetrafluoroethane, more preferably 1,1,1,2-tetrafluoroethane.

The present invention further relates to 6) a method for producing a styrene resin extruded foam according to the above 1) or the above 5), wherein the saturated hydrocarbon having 3 to 5 carbon atoms is one or more substances selected from the group consisting of propane, n-butane, i-butane, n-pentane, i-pentane and neopentane, preferably one ore more substances selected from the group consisting of propane, n-butane and i-butane, more preferably i-butane.

The invention further relates to 7) a method for producing a styrene resin extruded foam according to any of the above 1) to 6), wherein the ratio Z/X of cells contained in the foam wherein X is the average cell size in the direction of extrusion and Z is the average cell size in the direction of thickness intersecting at right angles to the extrusion direction is 1 or less, preferably 0.8 or less.

The invention further relates to 8) a method for producing a styrene resin extruded foam according to any of the above 1) to 7), wherein the foam after being extruded is stretched with heating again.

The invention further relates to 9) a method for producing a styrene resin extruded foam according to any of the above 1) to 8), wherein the thermal conductivity of the foam is 0.0244 Kcal/mhr° C. or less when determined using a measuring method for Type B heat insulating board prescribed under JIS A 9511.

The invention further relates to 10) a styrene resin extruded foam produced by a method according to any of the above 1) to 9).

Styrene resins employed in the invention may for example be homopolymers of a styrene monomer such as styrene, methylstyrene, ethylstyrene, isopropylstyrene, dimethylstyrene, bromostyrene, chlorostyrene, vinyltoluene or vinylxylene, copolymers of a combination of two or more of such monomers, and copolymers of a styrene monomer listed above with one or more monomers selected from divinylbenzene, butadiene, acrylic acid, methacrylic acid, methyl acrylate, methyl methacrylate, acrylonitrile, maleic anhydride, itaconic anhydride and the like. A monomer to be copolymerized with a styrene monomer, such as acrylic acid, methacrylic acid, methyl acrylate, methyl methacrylate, maleic anhydride or itaconic anhydride, can be used in such an amount that does not affect the physical characteristics of a final styrene resin extruded foam such as compressive strength. The styrene resins according to the invention are not limited to homopolymers or copolymers of styrene monomers listed above, and may also be a blend of a homopolymer or copolymer of a styrene monomer listed above with a homopolymer or copolymer of any of other monomers listed above, and may be blended with a diene rubber-reinforced polystyrene or an acrylic rubber-reinforced polystyrene.

In the invention, among the styrene resins listed above, a polystyrene resin can preferably be employed.

The blowing agent used in the invention contains one or more ethers selected from the group consisting of dimethyl ether, diethyl ether and methyl ethyl ether. Among these ethers, dimethyl ether is preferred especially because of its extremely high permeation rate as compared with air through styrene resin, which enables, when combined with a blowing agent having a low permeation rate, formation of a foam having a satisfactory cell structure, and provides a synergistic effect with a gas remaining in the foam, resulting in production of a foam which is excellent in both of heat insulating property and heat resistance. These ethers have a plasticizing effect on styrene resin equivalent to alkyl chlorides, which also makes them to be suitable as a blowing agent. Also since the ethers have a high permeation rate through styrene resin which allows them to be released from a foam within a relatively short period, an inflammable gas is not retained in the foam, thus lowering an adverse effect on the inflammability. In addition, since dimethyl ether is relatively less reactive among the ethers and stable, it is preferable when handled industrially. Furthermore, dimethyl ether has not been proven to have a mutagenicity which is observed with methyl chloride, and thus preferable also in view of an environmental compatibility.

An increased content of an ether in the blowing agent tends to increase fluctuation in an extrusion pressure which may lead to a less stable production and a poorer appearance of a foam obtained. At least 5% by weight, based on the entire amount of the blowing agent, of an ether should be added for the purpose of exerting the productivity increasing effects and the foam performance improving effects of the ether. Accordingly, the amount of an ether to be used is less than 40% by weight, preferably less than 30% by weight, and 5% by weight or more, based on the entire amount of the blowing agent.

A preferred blowing agent to be combined with such ether is mainly a saturated hydrocarbon having 3 to 5 carbon atoms, optionally with HFC, HCFC, an ether bond-having fluorinated hydrocarbon (hereinafter abbreviated as HFE) and the like. By combining such blowing agent with an ether, a satisfactory heat insulating property can be maintained for a relatively prolonged period while performing a relatively stable production of a foam industrially.

Saturated hydrocarbons having 3 to 5 carbon atoms have a boiling point within the range from −50° C. to 50° C., which is suitable to produce the styrene resin foam industrially. A hydrocarbon having too low boiling point shows a high vapor pressure, which requires a high pressure for handling, thus involving an industrial problem. A hydrocarbon having too high boiling point tends to liquefy and, hence, remains in a liquid state in the foam produced, which may lead to adverse effects on the physical characteristics such as heat resistance of the foam upon heating. Such saturated hydrocarbons are excellent also in terms of handling, stability and cost. The saturated hydrocarbons are also believed to have no effect on the ozone layer in general, and have a global warming potential which is lower by several hundred times to several ten times than that of flons, demonstrating an extremely high environmental compatibility. Among the saturated hydrocarbons listed above, those preferred because of their low prices and their levels of the permeability through styrene resin lower than that of air are propane, n-butane, i-butane, n-pentane, i-pentane and neopentane, and those further preferred because of their boiling points and permeability levels are propane, n-butane and i-butane, and that particularly preferred is i-butane because of its lower boiling point and its permeability which is lower by several times than those of n-butane and propane as well as its ability of remaining in a foam for a prolonged period which allows the heat insulating property to be exerted readily.

Since a flon selected from HFCs, HCFCs and HFEs has a relatively lower thermal conductivity in a gas phase when compared with saturated hydrocarbons and tends to remain in a foam whereby imparting the foam with an industrially satisfactory heat insulating property although it is somewhat poorer in terms of an environmental compatibility when compared with saturated hydrocarbons, it is desired to be employed industrially especially in a case where a foam having a heat insulating property which is further higher than that obtained by using a blowing agent comprising mainly an ether and a saturated hydrocarbon described above is desirable even if the environmental compatibility is somewhat compromised. Preferred examples of such flons, in view of a commercial availability, a price, a permeability through styrene resin and a thermal conductivity, are HFCs, especially HFC134a, difluoromethane (hereinafter abbreviated as HFC32), 1,1,1,2,3,3-hexafluoropropane (hereinafter abbreviated as HFC236ea), 1,1,1,3,3-pentafluoropropane (hereinafter abbreviated as HFC245fa) and HFC152a, with HFC134a, HFC236ea and HFC245fa being more preferred. HCFC142b is also a preferred flon which can be used industrially favorably in view of its price and solubility in styrene resin although it is further poorer in terms of an environmental compatibility when compared with HFCs.

Representatives of HFEs when employed in the invention are heptafluoropropyl methyl ether, heptafluoroisopropyl methyl ether, pentafluoroethyl methyl ether and bis (difluoromethyl) ether in view of their physical characteristics, such as boiling point, which are suited to a blowing agent, and more preferably, heptafluoropropyl methyl ether, heptafluoroisopropyl methyl ether and bis (difluoromethyl) ether can be selected. These may be employed alone or in combination with each other.

Such blowing agent to be used in combination with an ether has a low permeation rate as described above, and enables the formation of a satisfactory cell structure when combined with an ether, and can provide a foam whose heat insulating property and heat resistance are both satisfactory as a result of a synergistic effect of the cell structure satisfied and the gas of the blowing agent remaining in the foam. Such blowing agent to be used in combination is used in an amount corresponding mostly to the remainder after deleting an ether such as dimethyl ether from the entire amount of the blowing agent.

Such blowing agents to be used in combination with an ether may be used alone or in combination with each other.

Among such combinations of the blowing agents, a combination of an ether with a saturated hydrocarbon is the most preferred since it has the highest environmental compatibility, a relatively higher solubility in styrene resin and an ability of allowing the industrial production of a foam to be accomplished stably.

Thus, a preferred blowing agent, based on the reasons described above, is a blowing agent comprising mainly less than 40% by weight, preferably less than 30% by weight and 5% by weight or more, preferably 15% by weight or more, based on the entire amount of the blowing agent, of one or more ethers selected from the group consisting of dimethyl ether, diethyl ether and methyl ethyl ether, preferably an ether consisting of dimethyl ether alone, and more than 60% by weight, preferably more than 70% by weight and not more than 95% by weight, preferably not more than 85% by weight, based on the entire amount of the foaming agent, of one or more saturated hydrocarbons selected from the group consisting of saturated hydrocarbons having 3 to 5 carbon atoms, preferably one or more substances selected from the group consisting of propane, n-butane, i-butane, n-pentane, i-pentane and neopentane, more preferably one or more substances selected from the group consisting of propane, n-butane and i-butane, most preferably i-butane.

Since, when compared with flons, such saturated hydrocarbon has a somewhat higher thermal conductivity in a gas phase and has a somewhat lower heat insulating property-improving effect even if it remains in a foam, it is desirable in an industrial point of view to substitute a part of the saturated hydrocarbon with one or more HFCs selected from the group consisting of HFC134a, HFC32, HFC236ea, HFC245fa, HFC152a, preferably with HFC134a, especially in a case where a foam having a heat insulating property which is further higher than that obtained by using a blowing agent comprising mainly an ether and a saturated hydrocarbon described above is desirable even if the environmental compatibility is somewhat compromised.

While substitution of the entire amount of a saturated hydrocarbon with HFC listed above may also provide a foam which is satisfactory in terms of a cell-foaming ability, a compressive strength, a heat insulating property and a stability during manufacturing, a partial substitution is preferable in view of an environmental compatibility.

The ratio of HFC to a saturated hydrocarbon when a part of the latter is replaced with the former should be minimized as possible while taking the industrial requirement of a heat insulating property and a stability during manufacturing into consideration and also paying attention to an environmental compatibility, i.e., a load on an environment.

Similarly, as required, a part of the saturated hydrocarbon may be replaced with HCFC142b whose environmental compatibility is poorer than that of HFCs but whose solubility in styrene resin is relatively higher and which provides a good stability in industrial production and which is preferable also in view of its inflammability and price. In such case, it is desirable that the amount of HCFC142b is taken into consideration similarly as in the case of HFCs discussed above.

Thus, when a part of the saturated hydrocarbon is replaced with HFC or HCFC142b, if priority is given to an environmental compatibility when considering the requirements described above, it is desirable to use a saturated hydrocarbon in an amount as high as 50% by weight or higher, preferably 60% by weight or higher and a flon in an amount as low as 50% by weight or less, preferably 40% by weight or less, based on the remainder after deleting the ether from the entire amount of the blowing agent. On the other hand, when priority is given to the thermal characteristics such as thermal conductivity, a flon can be used in an amount of 10% by weight or more. Thus, the composition of a blowing agent is appropriately determined depending on properties demanded for final products, for example, whether priority is given either to the environmental compatibility or to the thermal characteristics.

In the present invention, the following embodiments of a blowing agent composition which is preferable when priority is given to the thermal characteristics such as thermal conductivity even if the environmental compatibility is somewhat compromised are exemplified.

In the first embodiment, a blowing agent comprises mainly less than 40% by weight, preferably less than 30% by weight, more preferably less than 25% by weight and 5% by weight or more, preferably 10% by weight or more, based on the entire amount of the blowing agent, of one or more ethers selected from the group consisting of dimethyl ether, diethyl ether and methyl ethyl ether, preferably an ether consisting of dimethyl ether alone, and more than 60% by weight, preferably more than 70% by weight, more preferably more than 75% by weight and not more than 95% by weight, preferably not more than 90% by weight, based on the entire amount of the blowing agent, of HFC134a.

In the second embodiment, a blowing agent comprises mainly less than 40% by weight, preferably less than 30% by weight, and 5% by weight or more, based on the entire amount of the blowing agent, of one or more ethers selected from the group consisting of dimethyl ether, diethyl ether and methyl ethyl ether, preferably an ether consisting of dimethyl ether alone, and more than 60% by weight, preferably more than 70% by weight, and not more than 95% by weight, based on the entire amount of the blowing agent, of one or more substances selected from the group consisting of HFC32, HFC236ea, HFC245fa and HFC152a.

In the third embodiment, a blowing agent comprises mainly less than 40% by weight, preferably less than 30% by weight, more preferably less than 25% by weight and 5% by weight or more, preferably 10% by weight or more, based on the entire amount of the blowing agent, of one or more ethers selected from the group consisting of dimethyl ether, diethyl ether and methyl ethyl ether, preferably an ether consisting of dimethyl ether alone, and more than 60% by weight, preferably more than 70% by weight, more preferably more than 75% by weight and not more than 95% by weight, preferably not more than 90% by weight, based on the entire amount of the blowing agent, of HFC142b.

The amount of a blowing agent relative to a styrene resin may vary depending on the expansion ratio and other conditioning parameters, and in general the total amount of the blowing agent is preferably 4 to 20 parts by weight per 100 parts by weight of a styrene resin. An amount of a blowing agent less than the level specified above may result in a low expansion ratio which leads to a difficulty in exerting the characteristics of a resin foam such as a reduced weight and a heat insulating property, while an amount exceeding the level specified above may allow disadvantages such as void to be formed in a foam due to the excessive amount of the blowing agent. When the amount of a blowing agent relative to a styrene resin is represented as molar amount of the blowing agent, the preferred total amount of the blowing agent is 0.1 to 0.25 mole, more preferably 0.1 to 0.18 mole per 100 g of a styrene resin.

In the invention, another known blowing agent may also be incorporated if necessary, provided that the effect of the invention is not affected adversely.

Such blowing agents includes, for example, fluorinated hydrocarbons such as 1,2-difluoroethane, 1,1,1-trifluoroethane, 1,1,2-trifluoroethane, 1,1,2,2-tetrafluoroethane, 1,1,1,2,2-pentafluoroethane and trifluoromethane, inorganic gases such as carbon dioxide, nitrogen, water, argon and helium, ethers excluding dimethyl ether, diethyl ether and methyl ethyl ether and including isopropyl ether, n-butyl ether, diisoamyl ether, furan, furfural, 2-methylfuran, tetrahydrofuran and tetrahydropyrane, carboxylic acid esters such as methyl formate, ethyl formate, propyl formate, butyl formate, amyl formate, methyl propionate and ethyl propionate, alcohols such as methanol, ethanol, propyl alcohol, i-propyl alcohol, butyl alcohol, i-butyl alcohol and t-butyl alcohol, ketones such as dimethyl ketone, methyl ethyl ketone, diethyl ketone, methyl n-propyl ketone, methyl n-butyl ketone, methyl i-butyl ketone, methyl n-amyl ketone, methyl n-hexyl ketone, ethyl n-propyl ketone and ethyl n-butyl ketone. These substances may be employed alone or in combination with each other.

In the invention, known additives including nucleating agents such as silica, talc, calcium silicate, wollastonite, kaoline, clay, mica, zinc oxide and titanium dioxide, lubricating agents such as fatty acid metal salts, i.e., calcium stearate and barium stearate, flame retardants such as hexabromocyclododecane, antioxidants such as high molecular weight hindered phenol compounds may also be incorporated.

The amount of the nucleating agent employed is preferably less than 0.5 part by weight, more preferably less than 0.3 part by weight, most preferably less than 0.15 part by weight per 100 parts by weight of a styrene resin. When the amount of the nucleating agent is unnecessarily large, the resulting foam tends to become slightly brittle. A too small amount of the nucleating agent may result in a difficulty in obtaining a satisfactory cell structure, and thus the amount of the nucleating agent is preferably 0.05 part by weight or more.

Other additives may also be added if necessary in respective appropriate amounts, provided that they do not affect the effects of the invention adversely.

The styrene resin extruded foam according to the invention can be produced by an ordinary extrusion foaming technology. Thus, a styrene resin extruded foam can be produced by heat-melting a styrene resin in an extruder or a like device, introducing a blowing agent into the styrene resin under a high pressure to form a fluid gel, cooling the fluid gel to a temperature suitable to an extrusion foaming, and then extruding the fluid gel through a die into a lower pressure zone to thereby cause foaming.

The pressure under which a blowing agent is introduced is not particularly limited, and may be at any level which are higher than the internal pressure of an extruder for introducing the blowing agent into the extruder.

The temperature, the time period and the means for melting a styrene resin by heating are not particularly limited. The temperature for heating may be at any level which is higher than that at which the styrene resin melts, and generally within a range from about 150° to 250° C. While the time period for melting may vary depending on the amount extruded per unit of time and the means for melting and cannot be determined all at once, but it is so adjusted that it allows a styrene resin and a blowing agent to be mixed and dispersed uniformly. The means for melting may not particularly be limited as far as a device used in a usual extrusion foaming, such as a screw type extruder, is employed. While the temperature at which an extrusion foaming through a die is performed may vary depending on various factors such as the type of the resin, the type and amount of the blowing agent as well as the composition thereof, and the desired expansion ratio and thus cannot be determined all at once, it can appropriately be adjusted so that desired physical characteristics of a resultant foam can be achieved.

Although the method for producing a foam using the above-specified blowing agent according to the present invention can be performed relatively stably, a further enhanced stability due to a further reduction in the pressure fluctuation or a further higher dispersibility of the blowing agent, if desired, can be accomplished by a method for controlling the conditions, for example, by elevating the internal pressure of the extruder, or by a method employing an extruder combined with or connected to a mixer with a cooling function disclosed in JP, B, 31-5393 or an equivalent mixing device enabling a simultaneous cooling and having a large capacity, or by a method employing an extruder connected to a known kneading device which is generally referred to as a static mixer or a cavity transfer mixer.

The foam according to the invention naturally has a high heat insulating ability, i.e., a low thermal conductivity. However, the saturated hydrocarbons described above have somewhat higher thermal conductivity as compared with flons which have been suitably employed for heat insulating uses. Therefore, it is preferred to allow to contain cells with a specified cell size ratio in the foam for ensuring the heat insulating performance at the conventional or higher level or maintaining a low thermal conductivity for a prolonged period as compared with prior arts.

The heat insulating ability of a foam with an average cell size of about 2 mm or less is determined not only by the heat conduction heat transfer of the resin and the gas but also by the thermal radiation heat transfer between the cell membranes. Among them, the heat conduction heat transfer is almost determined by the type of the resin and the type of the gas in the cells and does not fluctuate significantly in response to the foam structure. On the contrary, the thermal radiation heat transfer varies greatly depending on the cell structure of the foam since it is determined by a difference between the fourth power of the temperature of cell membrane and the fourth power of the temperature of another cell membrane facing each other. Thus, the difference in temperature between the cell membranes facing each other is almost a proportional fraction of the difference in temperature between the top surface and the bottom surface of the foam when the temperatures of both the surfaces of the foam having certain thicknesses are fixed.

Therefore, the difference in temperature between the cell membranes facing each other tends to decrease as the number of the membranes increases, which leads to the reduction of the thermal radiation heat transfer and, consequently, the reduction of the thermal conductivity of the foam. A method of stretching the cells of the foam in the direction of extrusion to make the shape of the cell rather planar, i.e., to make the length in the direction of extrusion relatively longer than the cell size in the direction of thickness, can be proposed for increasing the number of the membranes in certain thickness of the foam besides a method of reducing the average cell size of the foam.

Nevertheless, the thickness of the individual cell membrane tends to be reduced when the number of the membranes increases simply. It is considered that with a thinner cell membrane, infrared ray in radiation heat conduction can be transmitted more readily, resulting in an increased amount of heat due to radiation. Accordingly, from the viewpoint of thermal radiation heat transfer, an optimum region would exist with respect to the shape of a planar cell, i.e., the ratio of the cell size in the direction of thickness to the cell size in the direction of extrusion.

Thus, the raitio $Z/X$ of cells contained in the foam (hereinafter referred to as "cell size ratio") is preferably 1 or less, more preferably 0.8 or less wherein X is the average cell size in the direction of extrusion and Z is the average cell size in the thickness direction crossing the extrusion direction at right angles. A cell size ratio $Z/X$ exceeding 0.8, especially exceeding 1, results in a markedly reduced number of the cells contained in a unit thickness of the foam (thus results in a greater difference in temperature between the cell membranes), which may lead to increasing of radiation heat transfer, resulting in an increased thermal conductivity. On the other hand, the cell size ratio $Z/X$ is preferably 0.1 or more, more preferably 0.3 or more. When the cell size ratio $Z/X$ is too low, the cell membrane serving as a barrier against radiation in the direction of thickness becomes too thin, which allows the amount of heat by radiation to be transmitted easily, resulting in an increased thermal conductivity.

By limiting the cell size ratio $Z/X$ within the range specified above, the thermal conductivity of a foam can be kept at a level around that of air or lower for a prolonged period even if a blowing agent having a thermal conductivity somewhat higher than those of flons is employed. For example, it becomes easy to satisfy the standard prescribed under JIS A 9511 for Type B Class 3 heat insulating board, which is particularly favorable in the present invention.

The cell size ratio described above is a ratio of Z which is the average cell size in the thickness direction to X which is the average cell size in the extrusion direction. In general, the cell size in the extrusion direction of a foam is greater than the cell size in the transverse direction, but this relationship may be inverted under a certain manufacturing condition. In such case, it is preferable that the cell size in the transverse direction is employed as X for calculation and control.

Methods for controlling the cell size ratio described above may involve one wherein by means of a device fitted around a die of an extruder for controlling the output speed of a foam from the die, the tendency to push the foam back to the die or to pull the foam from the die is somewhat enhanced. Alternatively, such control can be accomplished by adjusting the line speed of the extruded foam by narrowing the die width. However, such methods tend to allow the cell size ratio to reach to a minimum of about 1 to 0.8 at most.

Thus, for adjusting the cell size ratio within more preferred range, a method of stretching a foam once extruded with heating simultaneously is preferred. For example, the stretching is accomplished by moving a foam in a heating device (reheating device) while nipping the foam by means of rolls for stretching or a like means disposed in the inside or at the outlet or both of the outlet and inlet of the heating device and making faster the rotation speed of the rolls at the outlet side of the heating device. This process may be performed immediately after extrusion as a continuous process, or may be performed afterward on the individual foams. The continuous process is preferred for the industrial production.

In the case of the continuous process where the stretching is performed in succession immediately after the extrusion, the rolls disposed at the inlet of the heating device may not be necessary since a foam before entering the heating device is difficult to be stretched and thus has a function similar to the rolls disposed at the inlet by itself. The difference in rotation speed between the rolls for stretching may be adjusted appropriately to obtain the desired cell size ratio.

A temperature and a time period which allow the foam to be softened so as to perform the foam stretching are preferable for the temperature and the time period for the heating (reheating). Such temperature and time period may vary depending on the type of the heating process, the type of the resin, the content of the blowing agent, the expansion ratio, the closed cell ratio, the output rate from the die, the foam thickness and the like and thus cannot be determined all at once. A higher heating temperature or a longer heating time for the stretching tends to cause defects in the appearance such as an extensive burn, erosion, melt and the like, while a lower heating temperature or a shorter heating time for the stretching tends to cause a difficulty in stretching the foam and result in a final product having defects such as crack. Accordingly, the stretching is performed preferably at a temperature between the glass transition temperature and the temperature higher by about 80° C. than the grass transition temperature of a resin at the time when the resin is extruded and for a period of about 30 seconds to about 3 minutes. Furthermore, in view of efficient utilization of the heat retained in a foam just extruded which is advantageous also for the heating, the stretching immediately after the extrusion process is also preferable.

For example, when about 25% by weight of dimethyl ether is contained in the blowing agent and the foam has a thickness of 60 mm, the heating at about 140° C. for about 1 minutes and 30 seconds is preferable.

It is the most convenient for industrial method to blow a heated air while warming the heating device. However, as required, heating via other medium such as a heated water vapor or heating using infrared or far infrared rays may also be employed.

Since the average cell size of the foam according to the invention is related with the expansion ratio and determines the thermal conductivity of the foam, it cannot be decided all at once. However, it is preferably about 0.01 mm or more and about 1 mm or less when the expansion ratio is 10 to 50 times, with the range of 0.1 mm to 0.6 mm being relatively more preferable.

For the purpose of satisfactorily maintaining the thermal conductivity of the foam according to the invention, the thickness of the foam is preferably 120 mm or less, more preferably 100 mm or less. A too thick foam tends to prolong the time period required for allowing an ether such as dimethyl ether to be released from the foam and, instead, air to enter the foam thereby reaching to an equilibrium state, which results in a need of a special effort to obtain a stabilized thermal conductivity. On the contrary, a thickness as too small as 5 mm or less tends to allow the gas to be transmitted within a too short period, resulting in an early onset of deterioration of the heat insulating property.

In general, the standard of heat insulating property for heat insulating foamed boards made from a styrene resin by an extrusion foaming method is that prescribed for Type B heat insulating board under JIS A 9511. Among this type, Type B Class 2 and Type B Class 3 are subjected to the standards of the thermal conductivity of 0.029 Kcal/mhr° C. or less and 0.024 Kcal/mhr° C. or less, respectively. While the insulating boards of Type B Class 2 and Type B Class 3 are employed preferably in the parts for which a high heat insulating performance is required, such as a heat insulating material for house building and the like, an insulating board of Type B Class 3 is especially preferred as a heat insulating material for use in a cold district for which a higher heat insulating performance than that of an insulating board of Type B Class 2 is required.

A blowing agent which has been employed in production of a foam for Type B Class 3 is an alkyl chloride such as methyl chloride, in combination with a flon, which has been employed in a large amount. This is because of the fact that the value 0.024 Kcal/mhr° C. is close to the thermal conductivity of air and that a flon which tends to remain in the foam due to its less permeability through styrene resin, and has a low thermal conductivity is preferable when taking an increase in the thermal conductivity due to the resin constituting the foam and radiant heat conduction into consideration, and also because of the prejudice that there is no achievement without flons.

According to the invention, the use of alkyl chlorides or flons represented by CFCs, which have been desired to be replaced if possible, is avoided as far as possible, and, instead, by utilizing the low thermal conductivity and low permeability of saturated hydrocarbons having 3 to 5 carbon atoms and by controlling the cell structure of the foam, the thermal conductivity of the foam which is close to that of air or lower is obtained, whereby readily achieving, for example, a thermal conductivity equivalent to that of the standard prescribed under JIS A 9511 for Type B Class 3.

Thus, the foam according to the invention has a thermal conductivity close to that of air, more particularly, a thermal conductivity not more than 0.0244 Kcal/mhr° C. when determined using a method for measuring the thermal conductivity of Type B heat insulating board prescribed under JIS A 9511. When the cell size ratio is controlled as described above, the thermal conductivity can further be reduced and can be kept at 0.0244 Kcal/mhr° C. or less for a prolonged period.

As discussed above, the invention enables an industrially stable production of a styrene resin foam having an excellent heat insulating property while allowing the blowing agent which is problematic with regard to an environmental compatibility to be substituted.

BEST MODE FOR CARRYING OUT THE INVENTION

A method of producing a styrene resin extruded foam according to the invention and a foam thereby are described further in detail on the basis of the following Examples, which are not intended to restrict the invention. Unless otherwise specified, "part" is part by weight and "%" is % by weight.

In the following, the abbreviations represent substances mentioned below.
DME: Dimethyl ether
CFC12: Difluorodichloromethane In Examples, foams are characterized for their appearance, expansion ratio, closed cell ratio, average cell size and cell size ratio, change in thermal conductivity with lapse of time, compressive strength, production stability and environmental compatibility according to the methods described below.

1) Appearance of Foam
○: There are no unfoamed resin or voids in the section, and there are no wrinkles or protrusions on the surface, thus exhibiting a very satisfactory appearance.
X: There are unfoamed resin and voids in the section, and there are wrinkles and protrusions on the surface, thus exhibiting a very poor appearance.

2) Expansion Ratio

Assuming the density of a styrene resin employed as 1.05 (g/cm$^3$), the expansion ratio is obtained by using the following equation.

Expansion ratio (times)=1.05/Density of foam (g/cm$^3$)

The density of the foam is calculated based on the weight of the foam and the volume determined by a water immersion method.

3) Closed Cell Ratio

The calculation was made in accordance with ASTM D-2856 using a multi-pycnometer (YUASA IONICS CO., LTD.).

4) Average Cell Size and Cell Size Ratio

Each of a longitudinal section along with the direction of extrusion and a transverse section perpendicular to the extrusion direction is magnified by 30 times using a scanning electron microscope (Hitachi, Ltd., Model S-450) to take a picture, which is copied by a dry copying machine. On the copy thus obtained, 3 to 5 lines are drawn in each of the extrusion, thickness or transverse directions, and the length of each line is divided by the number of the cells located on each line to obtain an average cell size in each direction (the average cell sizes in the directions of extrusion and thickness are obtained from the copy of the longitudinal section of the foam, while the average cell size in the transverse direction is obtained from the copy of the transverse section of the foam). Each line is drawn with excluding the cells whose images were incomplete at the margin of the copy.

The average cell sizes in the three directions are designated as X for the average cell size in the extrusion direction, Y for the average cell size in the transverse direction and Z for the average cell size in the thickness direction, which are multiplied to obtain a product, a cubic root of which is calculated and represented as an average cell size of the foam. The value of Z/X is calculated and represented as a cell size ratio.

4) Thermal Conductivity

The thermal conductivity is determined in accordance with JIS A 9511. A test piece is cut off from the central portion of an extruded foam, and the thermal conductivity is determined 1 week, 1 month, 3 months, 6 months and 1 year after production, and evaluated according to the criteria shown below.

⊚: 0.0234 Kcal/mhr° C. or less
○: 0.0239 Kcal/mhr° C. or less
Δ: 0.0244 Kcal/mhr° C. or less
X: Exceeding 0.0244 Kcal/mhr° C.

5) Compressive Strength

Determined in accordance with JIS A 9511 and evaluated according to the criteria shown below.

○: 2.0 kgf/cm$^2$ or more
X: Less than 2.0 kgf/cm$^2$

6) Production Stability

The following three procedures are employed for evaluation.

(1) Adjustment of Extrusion Pressure

Over a period of 8 hours of the extrusion from the time when the sampling of a product is initiated, the number of the procedure to be repeated for recovering the initial pressure of the extruder (mainly by adjusting the rpm) in response to the deviation by 10 kgf/cm$^2$ from the initial pressure is determined and the results are evaluated in accordance with the following criteria.

○: Less than 16 times (the same condition can be kept for 30 minutes or more on an average)
X: 16 times or more (the same condition can be kept for 30 minutes or less on an average)

(2) Deviation in Thickness of Foam

Over 8 hours of the extrusion, a foam is sampled at intervals of 30 minutes, and the thickness of each of the 16 samples obtained in total is determined, and the deviation represented by the following equation is calculated and evaluated in accordance with the following criteria.

Deviation (%)=[(Maximum thickness−Minimum thickness)/(Average thickness)]×100

○: Deviation less than 5%
Δ: Deviation of 5% or more and less than 10%
X: Deviation of 10% or more (3) Average Extrusion Pressure and Maximum Extrusion Pressure difference The average extrusion pressure and the difference between the average extrusion pressure and the maximum extrusion pressure over 2 hours of the extrusion foaming are shown.

7) Environmental Compatibility

The degree of an environmental compatibility is designated using asterisks. A higher environmental compatibility is represented a lager number of the asterisks.

EXAMPLE 1

100 parts of a polystyrene resin (Asahi Chemical Industry Co., Ltd., trade name: G9401, melt Index (MI): 2.0) is mixed with 0.1 part of talc as a nucleating agent and 3.0 parts of hexabromocyclododecane as a flame retardant, and the mixture is introduced at an input of 40 kg/hour into an extruder, where while the mixture is kneaded at 200° C., 8 parts in total of a blowing agent composed of 25% dimethyl ether and 75% n-butane per 100 parts of the polystyrene resin is injected thereinto, and the mixture is cooled to 115° C. through a mixer with a cooling function, and then extruded into a foam through a 2 mm-gapped slit and a mold which had a passage coated with a fluorinated resin and a clearance of 60 mm in the direction of thickness, whereby obtaining a styrene resin extruded foam in the form of board. The results of the evaluation are shown in Table 1.

The resultant foam is a foam whose heat insulating ability, compressive strength, production stability and environmental compatibility are all excellent.

EXAMPLES 2 to 34

Foams are obtained in a similar manner as in Example 1 except that the composition of the blowing agent is changed to those shown in Tables 1 to 3. In Examples 8 to 27, the total amount of a blowing agent is represented as number of moles per 100 g of the polystyrene resin. The results of the evaluation are shown in Tables 1 to 3. Any of the resultant foams is one whose heat insulating ability, compressive strength, production stability and environmental compatibility are all excellent similarly to the foam obtained in Example 1.

In each of Examples 2, 3, 5, 6, 7, 11, 15, 16, 17, 19, 22, 23, 29, 30, 32 and 33, a foam just after extruded is subjected to a stretching treatment in a manner wherein while the foam is heated again about 1 minutes and 20 seconds in a heating device which is warmed with a heated air of about 140° C. and has take-off rolls at its outlet, the take-off rolls are rotated.

Comparative Example 1

A styrene resin extruded foam is obtained in a similar manner as in Example 1 except for using 8 parts in total of a blowing agent composed of 60% methyl chloride and 40% propane per 100 parts of the polystyrene resin. The results of the evaluation are shown in Table 4. The resultant foam is one whose heat insulating ability and production stability are poor and whose environmental compatibility is also poor.

Comparative Examples 2 to 19

Styrene resin extruded foams are obtained in a similar manner as in Example 1 except that the composition of the blowing agent is changed to those shown in Tables 4 and 5. In Comparative Examples 6, 8 to 19, the total amount of the blowing agent is represented as the number of moles per 100 g of the polystyrene resin. The results of the evaluation are shown in Tables 4 and 5. Each of the resultant foams was one whose heat insulating ability, compression stability, production stability or environmental compatibility is poor.

TABLE 1

| | Examples | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Blowing agent composition (% by weight) | | | | | | | | | | | | |
| DME | 25 | 35 | 25 | 5 | 25 | 25 | 20 | 15 | 23 | 28 | 35 | 20 |
| Propane | | 65 | | | | 35 | | | | | | |
| n-Butane | 75 | | | | | 40 | 30 | | | | | |
| i-Butane | | | | | 75 | | | | | | | |
| i-Pentane | | | 75 | 95 | | | 50 | | | | | |
| HFC134a | | | | | | | | 85 | 77 | 72 | 65 | |
| HFC32 | | | | | | | | | | | | 80 |
| HFC236ea | | | | | | | | | | | | |
| HFC245fa | | | | | | | | | | | | |
| HFC152a | | | | | | | | | | | | |
| HCFC142b | | | | | | | | | | | | |
| Total amount of blowing agent | | | | | | | | | | | | |
| Part | 8 | 9 | 11 | 11 | 8 | 8 | 10 | | | | | |
| mol | | | | | | | | 0.15 | 0.15 | 0.16 | 0.17 | 0.15 |
| Expansion ratio (times) | 35 | 33 | 35 | 35 | 35 | 34 | 32 | 31 | 33 | 32 | 32 | 30 |
| Closed cell ratio (%) | 95 | 92 | 95 | 93 | 98 | 92 | 95 | 91 | 93 | 95 | 91 | 91 |
| Average cell size (mm) | 0.3 | 0.3 | 0.3 | 0.2 | 0.2 | 0.3 | 0.3 | 0.2 | 0.2 | 0.2 | 0.2 | 0.2 |
| Cell size ratio | 0.9 | 0.5 | 0.5 | 0.9 | 0.5 | 0.6 | 0.7 | 0.9 | 0.9 | 0.8 | 0.6 | 0.8 |
| Foam appearance | ○ | ○ | ○ | ○ | ○ | ○ | ○ | ○ | ○ | ○ | ○ | ○ |
| Compressive strength | ○ | ○ | ○ | ○ | ○ | ○ | ○ | ○ | ○ | ○ | ○ | ○ |
| Thermal conductivity | | | | | | | | | | | | |
| 1 week | ○ | Δ | ○ | ○ | ◎ | Δ | ○ | ◎ | ◎ | ◎ | | |
| 1 month | ○ | Δ | ○ | ○ | ◎ | Δ | ○ | ◎ | ◎ | ◎ | | |
| 3 months | ○ | Δ | ○ | ○ | ◎ | Δ | ○ | ◎ | ◎ | ○ | ○ | |
| 6 months | Δ | Δ | ○ | ○ | ◎ | Δ | ○ | ◎ | ◎ | ○ | ○ | |
| 1 year | Δ | Δ | ○ | ○ | ◎ | Δ | Δ | ◎ | ◎ | ○ | ○ | |
| Production stability | | | | | | | | | | | | |
| Number of procedure repeated | 6 | 15 | 8 | 11 | 7 | 8 | 9 | 6 | 8 | 5 | 9 | 6 |
| Deviation in thickness | ○ | ○ | ○ | ○ | ○ | ○ | ○ | ○ | ○ | ○ | ○ | ○ |
| Average extrusion pressure (kgf/cm$^2$) | 65 | 60 | 65 | 80 | 55 | 65 | 75 | 80 | 71 | 62 | 59 | 75 |
| Maximum extrusion difference (kgf/cm$^2$) | 0 | 5 | 0 | 5 | 5 | 0 | 5 | | | | | |
| Environmental compatibility | **** | **** | **** | **** | **** | **** | **** | ** | ** | ** | ** | ** |

TABLE 2

| | Examples | | | | | | | | | | | |
|---|---|---|---|---|---|---|---|---|---|---|---|---|
| | 13 | 14 | 15 | 16 | 17 | 18 | 19 | 20 | 21 | 22 | 23 | 24 |
| Blowing agent composition (% by weight) | | | | | | | | | | | | |
| DME | 20 | 20 | 40 | 40 | 40 | 10 | 30 | 20 | 30 | 30 | 30 | 15 |
| Propane | | | | | | | 30 | | | | 25 | |
| n-Butane | | | | | | | | | 30 | | | |
| i-Butane | | | | | | | | | | | | |
| i-Pentane | | | | | | | | | | 10 | | |
| HFC134a | | | | | | | | 50 | | | | |
| HFC32 | | | 60 | | | | | | 45 | | | |
| HFC236ea | 80 | | | | | | | | | | | |
| HFC245fa | | 80 | | 60 | | | | | | | | |
| HFC152a | | | | | 60 | 90 | | | | | | |
| HCFC142b | | | | | | | 40 | 30 | 25 | 40 | 35 | |
| Total amount of blowing agent | | | | | | | | | | | | 85 |
| Part mol | 0.15 | 0.15 | 0.15 | 0.16 | 0.16 | 0.15 | 0.17 | 0.15 | 0.17 | 0.6 | 0.17 | 0.15 |
| Expansion ratio (times) | 30 | 31 | 31 | 31 | 32 | 32 | 35 | 31 | 34 | 31 | 33 | 32 |
| Closed cell ratio (%) | 91 | 93 | 94 | 95 | 95 | 95 | 93 | 91 | 95 | 98 | 95 | 95 |
| Average cell size (mm) | 0.2 | 0.2 | 0.2 | 0.2 | 0.2 | 0.2 | 0.3 | 0.3 | 0.4 | 0.4 | 0.3 | o.2 |
| Cell size ratio | 0.8 | 0.8 | 0.6 | 0.6 | 0.6 | 0.9 | 0.7 | 0.8 | 0.8 | 0.7 | 0.7 | 0.9 |
| Foam appearance | ○ | ○ | ○ | ○ | ○ | ○ | ○ | ○ | ○ | ○ | ○ | ○ |
| Compressive strength | ○ | ○ | ○ | ○ | ○ | ○ | ○ | ○ | ○ | ○ | ○ | ○ |
| Thermal conductivity | | | | | | | | | | | | |
| 1 week | ◎ | ◎ | ○ | ○ | ○ | ◎ | 502 | ◎ | ◎ | ◎ | ◎ | ◎ |
| 1 month | ◎ | ◎ | ○ | ○ | ○ | ◎ | ○ | ○ | ○ | ○ | ◎ | ○ |
| 3 months | ○ | ○ | ○ | ○ | ○ | ◎ | ○ | ○ | ○ | ○ | ○ | ◎ |
| 6 months | ○ | ○ | Δ | Δ | Δ | ◎ | Δ | ○ | ○ | Δ | ○ | ◎ |
| 1 year | ○ | ○ | Δ | Δ | Δ | ○ | Δ | Δ | Δ | Δ | Δ | ◎ |
| Production stability | | | | | | | | | | | | |
| Number of procedure repeated | 6 | 6 | 6 | 5 | 5 | 7 | 9 | 1o | 11 | 10 | 9 | 5 |
| Deviation in thickness | ○ | ○ | ○ | ○ | ○ | ○ | ○ | ○ | ○ | ○ | ○ | ○ |
| Average extrusion pressure (kgf/cm$^2$) | 77 | 77 | 67 | 68 | 66 | 85 | 65 | 73 | 62 | 62 | 60 | 85 |
| Maximum extrusion pressure difference (kgf/cm$^2$) | | | | | | | | | | | | |
| Environmental compativility | ** | ** | ** | ** | ** | ** | *** | ** | ** | *** | *** | ** |

TABLE 3

| | Examples | | | | | | | | | |
|---|---|---|---|---|---|---|---|---|---|---|
| | 25 | 26 | 27 | 28 | 29 | 30 | 31 | 32 | 33 | 34 |
| Blowing agent composition (% by weight) | | | | | | | | | | |
| DME | 25 | 30 | 35 | 25 | 35 | 25 | 5 | 25 | 25 | 20 |

TABLE 3-continued

| | Examples | | | | | | | | | |
|---|---|---|---|---|---|---|---|---|---|---|
| | 25 | 26 | 27 | 28 | 29 | 30 | 31 | 32 | 33 | 34 |
| Propane | | | | | 35 | | | | 20 | |
| n-Butane | | | | 40 | | | | | 20 | 15 |
| i-Butane | | | | | | | | 45 | | |
| i-Pentane | | | | | | 45 | 50 | | | 25 |
| HFC134a | | | | 35 | 30 | 30 | | 30 | 35 | |
| HFC32 | | | | | | | | | | |
| HFC236ea | | | | | | | | | | |
| HFC245fa | | | | | | | | | | |
| HFC152a | | | | | | | | | | |
| HCFC142b | 75 | 70 | 65 | | | | 45 | | | 40 |
| Total amount of blowing agent | | | | | | | | | | |
| Part | | | | 9 | 10 | 12 | 12 | 9 | 9 | 12 |
| mol | 0.16 | 0.16 | 0.17 | | | | | | | |
| Expansion ratio (times) | 33 | 33 | 34 | 33 | 31 | 31 | 32 | 33 | 31 | 32 |
| Closed cell ratio (%) | 97 | 93 | 92 | 93 | 91 | 92 | 91 | 95 | 91 | 92 |
| Average cell size (mm) | 0.2 | 0.2 | 0.2 | 0.2 | 0.2 | 0.2 | 0.2 | 0.2 | 0.2 | 0.2 |
| Cell size ratio | 0.9 | 0.8 | 0.8 | 0.9 | 0.6 | 0.7 | 0.9 | 0.6 | 0.7 | 0.8 |
| Foam appearance | ○ | ○ | ○ | ○ | ○ | ○ | ○ | ○ | ○ | ○ |
| Compressive strength | ○ | ○ | ○ | ○ | ○ | ○ | ○ | ○ | ○ | ○ |
| Thermal conductivity | | | | | | | | | | |
| 1 week | ◎ | ◎ | ◎ | ◎ | ◎ | ◎ | ◎ | ◎ | ◎ | ◎ |
| 1 month | ◎ | ◎ | ◎ | ◎ | ◎ | ◎ | ◎ | ◎ | ◎ | ◎ |
| 3 months | ◎ | ◎ | ◎ | ◎ | ○ | ◎ | ◎ | ◎ | ○ | ○ |
| 6 months | ◎ | ◎ | ◎ | ○ | ○ | ○ | ○ | ◎ | ○ | ○ |
| 1 year | ◎ | ◎ | ○ | ○ | ○ | ○ | ○ | ◎ | ○ | ○ |
| Production stability | | | | | | | | | | |
| Number of procedure repeated | 4 | 7 | 9 | 5 | 5 | 5 | 6 | 5 | 6 | 7 |
| Deviation in thickness | ○ | ○ | ○ | ○ | ○ | ○ | ○ | ○ | ○ | ○ |
| Average extrusion (kgf/cm$^2$) | 78 | 72 | 68 | 65 | 60 | 65 | 80 | 55 | 65 | 75 |
| Maxmium extrusion pressure difference (kgf/cm2) | | | | 5 | 5 | 5 | 5 | 5 | 5 | 5 |
| Environmental compativility | ** | ** | ** | *** | *** | *** | *** | *** | *** | *** |

TABLE 4

| | Comparative Examples | | | | | | | | | |
|---|---|---|---|---|---|---|---|---|---|---|
| | 1 | 2 | 3 | 4 | 5 | 6 | 7 | 8 | 9 | 10 |
| Blowing agent composition (% by weight) | | | | | | | | | | |
| DME | | 70 | 50 | 90 | 80 | | 100 | | 50 | 80 |
| Propane | 40 | 30 | | | | | | | | |
| n-Butane | | | | 10 | 10 | | | | | |
| i-Butane | | | | | | 10 | | | | |
| i-Pentane | | | 50 | | 10 | | | | | |
| HFC134a | | | | | | | | 100 | 50 | 20 |
| HFC32 | | | | | | | | | | |
| HFC236ea | | | | | | | | | | |

TABLE 4-continued

| | Comparative Examples | | | | | | | | | |
|---|---|---|---|---|---|---|---|---|---|---|
| | 1 | 2 | 3 | 4 | 5 | 6 | 7 | 8 | 9 | 10 |
| HFC245fa | | | | | | | | | | |
| HFC152a | | | | | | | | | | |
| HCFC142b | | | | | | | | | | |
| Methyl Chloride | 60 | | | | | 90 | | | | |
| CFC12 | | | | | | | | | | |
| Total amount of blowing agent | | | | | | | | | | |
| Part | 8 | 7 | 9 | 8 | 8 | | 8 | | | |
| mol | | | | | | 0.17 | | 0.15 | 0.17 | 0.17 |
| Expansion ratio (times) | 35 | 29 | 27 | 26 | 30 | 26 | 25 | 21 | 30 | 23 |
| Closed cell ratio (%) | 90 | 45 | 38 | 50 | 40 | 69 | 45 | 25 | 89 | 58 |
| Average cell size (mm) | 0.3 | 0.4 | 0.4 | 0.5 | 0.4 | 0.4 | 0.5 | 0.1 | 0.2 | 0.4 |
| Cell size ratio | 1.1 | 1.1 | 1.2 | 1.4 | 1.4 | 1.1 | 1.5 | 1.0 | 1.1 | 1.2 |
| Foam appearance | ○ | x | x | x | x | ○ | x | x | x | x |
| Compressive strength | ○ | x | ○ | x | x | x | x | x | ○ | x |
| Thermal conductivity | | | | | | | | | | |
| 1 week | x | x | x | x | x | x | x | x | x | x |
| 1 month | x | x | x | x | x | x | x | x | x | x |
| 3 months | x | x | x | x | x | x | x | x | x | x |
| 6 months | x | x | x | x | x | x | x | x | x | x |
| 1 year | x | x | x | x | x | x | x | x | x | x |
| Production stability | | | | | | | | | | |
| Number of procedure repeated | 27 | 30 | 25 | 22 | 35 | 9 | 14 | 21 | 12 | 16 |
| Deviation in thickness | x | x | x | x | x | x | ○ | ○ | x | x |
| Average extrusion pressure (kgf/cm$^2$) | 55 | 45 | 45 | 39 | 40 | 40 | 34 | 94 | 50 | 38 |
| Maxmium extrusion pressure difference (kgf/cm$^2$) | 15 | 20 | 20 | 25 | 5 | | 5 | | | |
| Environmental compativility | ** | **** | **** | **** | **** | ** | **** | * | ** | *** |

TABLE 5

| | Comparative Examples | | | | | | | | |
|---|---|---|---|---|---|---|---|---|---|
| | 11 | 12 | 13 | 14 | 15 | 16 | 17 | 18 | 19 |
| Blowing agent composition (% by weight) | | | | | | | | | |
| DME | | | | 50 | 80 | | | | |
| Propane | | | | | | | | | |
| n-Butane | 20 | | | | | | | | |
| i-Butane | | | | | | | | | |
| i-Pentane | | | | | | | | | |
| HFC134a | | | | | | 100 | | | |
| HFC32 | | | | | | | | | |
| HFC236ea | | | | | | | 100 | | |
| HFC245fa | | | | | | | | 100 | |
| HFC152a | | | | | | | | | 100 |
| HCFC142b | | | 100 | 50 | 20 | | | | |
| Methyl Chloride | 80 | 20 | | | | | | | |
| CFC12 | | 80 | | | | | | | |

TABLE 5-continued

| | Comparative Examples | | | | | | | | |
|---|---|---|---|---|---|---|---|---|---|
| | 11 | 12 | 13 | 14 | 15 | 16 | 17 | 18 | 19 |
| Total amount of blowing agent Part mol | 0.14 | 0.15 | 0.15 | 0.17 | 0.17 | 0.13 | 0.13 | 0.13 | 0.14 |
| Expansion ratio (times) | 28 | 34 | 24 | 32 | 28 | 23 | 20 | 22 | 22 |
| Closed cell ratio (%) | 62 | 96 | 36 | 90 | 39 | 43 | 25 | 21 | 60 |
| Average cell size (mm) | 0.4 | 0.2 | 0.1 | 0.2 | 0.4 | 0.1 | 0.1 | 0.1 | 0.5 |
| Cell size ratio | 1.2 | 1.0 | 0.9 | 1.1 | 1.2 | 1.1 | 1.1 | 1.1 | 1.3 |
| Foam appearance | x | ○ | x | x | x | x | x | x | x |
| Compressive strength | x | ○ | x | ○ | x | x | x | x | x |
| Thermal conductivity | | | | | | | | | |
| 1 week | x | ◎ | x | ○ | x | x | x | x | ○ |
| 1 month | x | ◎ | x | ○ | x | x | x | x | Δ |
| 3 months | x | ◎ | x | ○ | x | x | x | x | Δ |
| 6 months | x | ◎ | x | Δ | x | x | x | x | x |
| 1 year | x | ◎ | x | Δ | x | x | x | x | x |
| Production stability | | | | | | | | | |
| Number of procedure repeated | 12 | 7 | 18 | 14 | 16 | 17 | 16 | 18 | 15 |
| Deviation in thickness | x | ○ | x | x | x | x | x | ○ | x |
| Average extrusion pressure (kgf/cm²) | 50 | 66 | 97 | 61 | 36 | 98 | 103 | 109 | 70 |
| Maximum extrusion pressure difference (kgf/cm²) | | | | | | | | | |
| Environmental compativility | ** | * | * | ** | *** | * | * | * | * |

As evident from Tables 1 to 3, a foam obtained in each Example using a blowing agent containing certain amounts of a saturated hydrocarbon and an ether has a satisfactory environmental compatibility and is also excellent in terms of various properties required industrially such as heat insulating ability, compressive strength and production stability.

According to the invention, a styrene resin extruded foam which is excellent in terms of environmental compatibility as well as in various properties required industrially such as heat insulating ability, compressive strength and production stability can be obtained.

What is claimed is:

1. A method for producing a styrene resin extruded foam comprising the steps of:

melting a styrene resin, introducing a blowing agent into the styrene resin, forming a fluid gel and then extruding the gel through a die into a lower pressure zone to thereby cause foaming, wherein the blowing agent comprises less than 40% by weight and 5% by weight or more, based on the entire amount of the blowing agent, of one or more ethers selected from the group consisting of dimethyl ether, diethyl ether and methyl ethyl ether, and more than 60% by weight and not more than 95% by weight, based on the entire amount of the blowing agent, of one or more saturated hydrocarbons selected from the group consisting of saturated hydrocarbons having 3 to 5 carbon atoms, and wherein the ratio Z/X of cells contained in the foam is 1 or less, wherein X is the average cell size in the direction of extrusion and Z is the average cell size in the direction of thickness intersecting at right angles to the extrusion direction, and the thermal conductivity of the foam is 0.0244 Kcal/mhr° C. or less when determined using a measuring method for Type B heat insulating board prescribed tinder JIS A 9511.

2. A method for producing a styrene resin extruded foam comprising the steps of:

melting a styrene resin, introducing a blowing agent into the styrene resin, forming a fluid gel and then extruding the gel through a die into a lower pressure zone to thereby cause foaming, wherein the blowing agent comprises less than 40% by weight and 5% by weight or more, based on the entire amount of the blowing agent, of one or more ethers selected from the group consisting of dimethyl ether, diethyl ether and methyl ethyl ether, and more than 60% by weight and not more than 95% by weight, based on the entire amount of the blowing agent, of 1,1-difluoro-1-chloroethane, wherein the ratio Z/X of cells contained in the foam is 1 or less, wherein X is the average cell size in the direction of extrusion and Z is the average cell size in the direction of thickness intersecting at right angles to the extrusion direction, and the thermal conductivity of the foam is 0.0244 Kcal/mhr° C. or less when determined using a measuring method for Type B heat insulating board prescribed under JIS A 9511.

3. A method for producing a styrene resin extruded foam comprising the steps of melting a styrene resin, introducing a blowing agent into the styrene resin, forming a fluid gel and then extruding the gel through a die into a lower pressure zone to thereby cause foaming, wherein the blowing agent comprises less than 40% by weight and 5% by weight or more, based on the entire amount of the blowing agent, of one or more ethers selected from the group consisting of dimethyl ether, diethyl ether and methyl ethyl ether, and more than 60% by weight and not more than 95% by weight, based on the entire amount of the blowing agent, of 1,1,1,2-tetrafluoroethane, wherein the ratio Z/X of cells contained in the foam is 1 or less, wherein X is the average cell size in the direction of extrusion and Z is the average cell size in the direction of thickness intersecting at right angles to the extrusion direction, and the thermal conductivity of the foam is 0.0244 Kcal/mhr° C. or less when determined using a measuring method for Type B heat insulating board prescribed under JIS A 9511.

4. A method for producing a styrene resin extruded foam by melting a styrene resin, introducing a blowing agent into the styrene resin, forming a fluid gel and then extruding the gel through a die into a lower pressure zone to thereby cause foaming, wherein a blowing agent comprises mainly less than 40% by weight and 5% by weight or more, based on the entire amount of the blowing agent, of one or more ethers selected from the group consisting of dimethyl ether, diethyl ether and methyl ethyl ether, and more than 60% by weight and not more than 95% by weight and not more than 95% by weight, based on the entire amount of the blowing agent, of one or more substances selected from the group consisting of 1,1,1,2,3,3-hexafluoropropane and 1,1,1,3,3-pentafluoropropane.

5. A method for producing a styrene resin extruded foam comprising the steps of:

melting a styrene resin, introducing a blowing agent into the styrene resin, forming a fluid gel and then extruding the gel through a die into a lower pressure zone to thereby cause foaming, wherein the blowing agent comprises less than 40% by weight and 5% by weight or more, based on the entire amount of the blowing agent, of one or more ethers selected from the group consisting of dimethyl ether, diethyl ether and methyl ethyl ether, and 50% by weight or more, based on the amount after subtracting the ether from the entire amount of the blowing agent, or one or more saturated hydrocarbons selected from the group consisting of saturated hydrocarbons having 3 to 5 carbon atoms and 50% by weight or less, based on the amount after subtracting the ether from the entire amount of the blowing agent, of one or more blowing agents selected form the group consisting of 1,1-difluoro-1-chloroethane, 1,1,1,2-tetrafluoroethane, difluoromethane, 1,1,1,2,3,3-hexafluoropropane, 1,1,1,3,3-pentafluoropropane and 1,1-difluoroethane, wherein the ratio Z/X of cells contained in the foam is 1 or less, wherein X is the average cell size in the direction of extrusion and Z is the average cell size in the direction of thickness intersecting at right angles to the extrusion direction, and the thermal conductivity of the foam is 0.0244 Kcal/mhr° C. or less when determined using a measuring method for Type B heat insulating board prescribed under JIS A 9511.

6. A method for producing a styrene resin extruded foam according to claim 1 or claim 5, wherein the saturated hydrocarbon having 3 to 5 carbon atoms is one or more substances selected from the group consisting of propane, n-butane, i-butane, n-pentane, i-pentane and neopentane.

7. The method for producing a styrene resin extruded foam according to claim 4, wherein the ratio Z/X of cells contained in the foam wherein X is the average cell size in the direction of extrusion and Z is the average cell size in the direction of thickness intersecting at right angles to the extrusion direction is 1 or less.

8. A method for producing a styrene resin extruded foam according to any one of claims 1 to 5, wherein the foam after being extruded is stretched with heating.

9. The method for producing a styrene resin extruded foam according to claim 4, wherein the thermal conductivity of the foam is 0.0244 Kcal/mhr° C. or less when determined using a measuring method for Type B heat insulating board prescribed under JIS A 9511.

10. A method for producing a styrene resin extruded foam according to any one of claims 1 to 5, wherein the ether is dimethyl ether.

11. A styrene resin extruded foam produced by a method according to any one of claims 1 to 5.

12. A method for producing a styrene resin extruded foam according to claim 1, wherein the ratio Z/X of cells contained in the foam is 0.8 or less.

13. A method for producing a styrene resin extruded foam according to claim 2, wherein the ratio Z/X of cells contained in the foam is 0.8 or less.

14. A method for producing a styrene resin extruded foam according to claim 3, wherein the ratio Z/X of cells contained in the foam is 0.8 or less.

15. A method for producing a styrene resin extruded foam according to claim 5, wherein the ratio Z/X of cells contained in the foam is 0.8 or less.

16. A method for producing a styrene resin extruded foam according to claim 7, wherein the ratio Z/X of cells contained in the foam is 0.8 or less.

* * * * *